United States Patent [19]

Muramoto et al.

[11] Patent Number: 4,812,549
[45] Date of Patent: Mar. 14, 1989

[54] RESINOUS COMPOSITION COMPRISING AN ACRYLIC RESIN HAVING END CARBOXYL BEARING LONG PENDANT GROUPS AND PREPARATION THEREOF

[75] Inventors: Hisaichi Muramoto, Osaka; Keizou Ishii, Ashiya; Tadafumi Miyazono, Takatsuki, all of Japan

[73] Assignee: Nippon Paint Co., Ltd., Osakashi, Japan

[21] Appl. No.: 1,010

[22] Filed: Jan. 7, 1987

[30] Foreign Application Priority Data

Jan. 8, 1986 [JP] Japan .................. 61-001901

[51] Int. Cl.⁴ ............................................. C08F 20/10
[52] U.S. Cl. .................................................... 526/318
[58] Field of Search ........................................ 526/318

[56] References Cited

U.S. PATENT DOCUMENTS

| Re. 27,151 | 6/1971 | Hicks | 526/318 |
| 2,861,058 | 11/1958 | Unruh et al. | 526/318 |
| 3,957,732 | 5/1976 | Hirooka et al. | 526/318 |
| 4,129,545 | 12/1978 | Sunamori et al. | 526/318 |
| 4,463,150 | 7/1984 | Kelley | 526/318 |
| 4,574,130 | 3/1986 | Potter et al. | 526/318 |

FOREIGN PATENT DOCUMENTS

| 60-221469 | 11/1985 | Japan | 526/318 |
| 991904 | 5/1965 | United Kingdom | 526/318 |
| 2036772 | 7/1980 | United Kingdom | 526/318 |

Primary Examiner—Joseph L. Schofer
Assistant Examiner—N. Sarofin
Attorney, Agent, or Firm—Woodcock Washburn Kurtz Mackiewicz & Norris

[57] ABSTRACT

A resinous composition comprising an acrylic resin having end carboxyl bearing long pendant groups of the formula:

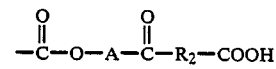

wherein $R_2$ is a substituted or unsubstituted aliphatic hydrocarbon having 2 to 10 carbon atoms, alicyclic hydrocarbon having 6 to 7 carbon atoms or aromatic hydrocarbon having 6 carbon atoms; A is a repeating unit of

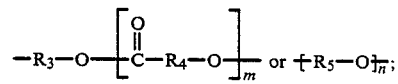

$R_3$ is ethylene or propylene; $R_4$ is a substituted or unsubstituted alkylene having 2 to 7 carbon atoms; $R_5$ is a substituted or unsubstituted alkylene having 2 to 5 carbon atoms; m is an integer of 1 to 10; and n is an integer of 2 to 50. The invention also concerns a process for preparing said resinous composition characterizing by polymerizing a monomer mixture containing end carboxyl bearing reactive acryl monomer of the formula:

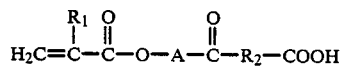

1 Claim, No Drawings

RESINOUS COMPOSITION COMPRISING AN ACRYLIC RESIN HAVING END CARBOXYL BEARING LONG PENDANT GROUPS AND PREPARATION THEREOF

FIELD OF THE INVENTION

The present invention relates to a novel resinous composition comprising an acrylic resin having end carboxyl bearing long pendant groups and to a preparation thereof.

BACKGROUND OF THE INVENTION

Since an acrylic resin is excellent in transparency and gloss and its hardness can be freely controlled by varying the kind and amount of the constituting monomers and especially acrylic or methacrylic ester used, such a resin has been widely used in various lacquer type or baking type coating compositions as a resinous vehicle.

Particulary, an acrylic resin having as a constituting unit an end carboxyl bearing reactive acryl monomer as acrylic acid, methacrylic acid, itaconic acid or the like is known to have a curing acceleration activity in the crosslinking reaction of said resin with an aminoplast resin and therefore, it is specifically useful as a curable type resin in a paint industry.

However, in the heretofore known end carboxyl bearing reactive acryl monomers, the chain length between a vinyl group and an end carboxyl group is relatively short and therefore, when it is incorporated into an acrylic resin, thus obtained resin can exhibit only a weak curing acceleration activity and hence there often results a poor crosslinking reaction.

It is, therefore, an object of the invention to provide a novel acrylic resin which has a satisfactorily higher level of self-catalytic action in a crosslinking reaction with an aminoplast resin, capable of resulting a coating with a higher crosslink density, and which is useful as a resinous vehicle in both curable and non-curable type coating compositions. An additional object of the invention is to provide an advantageous process for the preparation of such resin.

SUMMARY OF THE INVENTION

According to the invention, the aforesaid object can be attained with a resinous composition comprising an acrylic resin having end carboxyl bearing long pendant groups of the formula:

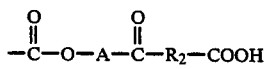

wherein $R_2$ is a substituted or unsubstituted aliphatic hydrocarbon having 2 to 10 carbon atoms, alicyclic hydrocarbon having 6 to 7 carbon atoms or aromatic hydrocarbon having 6 carbon atoms; A is a repeating unit of

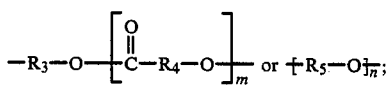

$R_3$ is ethylene or propylene; $R_4$ is a substituted or unsubstituted alkylene having 2 to 7 carbon atoms; $R_5$ is a substituted or unsubstituted alkylene having 2 to 5 carbon atoms; m is an integer of 1 to 10; and n is an integer of 2 to 50.

The present acrylic resinous composition may be advantageously prepared by the polymerization of a monomer mixture of (A) 0.1 to 30% by weight of the total monomers of an end carboxyl bearing reactive acryl monomer of the formula:

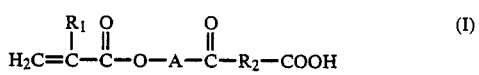

wherein $R_1$ is hydrogen or methyl group; A and $R_2$ are as defined above, and (B) 99.9 to 70% by weight of the total monomers of at least one other copolymerizable $\alpha,\beta$-ethylenically unsaturated monomers.

The end carboxyl bearing reactive acryl monomers (I) are novel compounds offered by the present inventors, which can be advantageously prepared, as stated in the co-pending Japanese Patent Application No. 1899/86, filed Jan. 8, 1986, by reacting an end hydroxyl bearing acrylate or methacrylate of the formula:

in which $R_1$ is hydrogen or methyl group; A is a repeating unit of

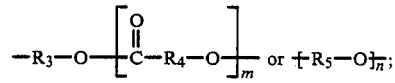

$R_3$ is ethylene or propylene; $R_4$ is a substituted or unsubstituted alkylene having 2 to 7 carbon atoms; $R_5$ is a substituted or unsubstituted alkylene having 2 to 5 carbon atoms; m is an integer of 1 to 10 and n is an integer of 2 to 50, with an acid anhydride of the formula:

in which $R_2$ is a substituted or unsubstituted aliphatic hydrocarbon having 2 to 10 carbon atoms, alicyclic hydrocarbon having 6 to 7 carbon atoms or aromatic hydrocarbon having 6 carbon atoms, preferably in the presence of a radical polymerization inhibitor.

Examples of end hydroxyl bearing acrylates or methacrylates are addition products of hydroxyethyl acryalte, hydroxyethyl methacrylate, hydroxypropyl acryalte, or hydroxypropyl methacrylate with a cyclic ester as $\beta$-propiolactone, $\delta$-valerolactone, $\delta$-caprolactone, $\epsilon$-caprolactone or the like, and addition products of acrylic acid or methacrylic acid with a cyclic ether as ethylene oxide, propylene oxide, tetrahydrofuran or the like.

Various such products are commercially available as, for example, Placcel FA-1 (1:1 addition product of hydroxyethyl acrylate and $\epsilon$-caprolactone), Placcel FM-1 (1:1 addition product of hydroxyethyl methacrylate and $\epsilon$-caprolactone), Placcel FA-3 (1:3 addition product of hydroxyethyl acrylte and $\epsilon$-caprolactone), Placcel FM-3 (1:3 addition product of hydroxyethyl methacrylate and ε-caprolactone), Placcel FA-5 (1:5 addition product of hydroxyethyl acrylate and ε-caprolactone), Placcel FM-5 (1:5 addition product of hydroxyethyl methacrylate and ε-caprolactone) (trademarks of Daicel Chem. Co.); Blenmer PE (addition product of methacrylic acid and ethylene oxide), Blenmer PP (addition product of methacrylic acid and propylene oxide) (trademarks of Nippon Yushi), and the like. Other similar products may easily be prepared as desired.

As the acid anhydrides of the aforesaid formula (III), mention is made of succinic anhydride, maleic anhydride, phthalic anhydride, tetrahydro phthalic anhydride, hexahydro phthalic anhydride, trimellitic anhydride, het acid anhydride, hymic anhydride, adipic anhydride, azelaic anhydride, sebacic anhydride and substituted derivatives thereof.

Though the reaction of said end hydroxyl bearing acrylate or methacrylate (II) and acid anhydride (III) may be easily carried out under heating and stirring conditions, it is preferred to be progressed in the presence of radical polymerization inhibitor as, for example, hydroquinone monomethyl ether for the protection of the end vinyl group. Usually, such radical polymerization inhibitor is used in a concentration of 5000 ppm or less, and more preferably 500 ppm or less.

The other copolymerizable α,β-ethylenically unsaturated monomers may be any of the members customarily used for the preparation of an acrylic resin, which are classified as follows:

(1) carboxyl bearing monomers: as, for example, acrylic acid, methacrylic acid, crotonic acid, itaconic acid, maleic acid, fumaric acid and the like,
(2) hydroxyl bearing monomers as, for example, 2-hydroxyethyl acrylate, hydroxypropyl acrylate, 2-hydroxyethyl methacryalte, hydroxypropyl methacrylate, hydroxybutyl acrylate, hydroxybutyl methacrylate, allyl alcohol and methallyl alcohol,
(3) nitrogen containing alkyl acrylates or methacrylates: as, for example, dimethylaminoethyl acrylate, dimethylaminoethyl methacrylate and the like,
(4) polymerizable amides as, for example, acrylic amide and methacrylic amide,
(5) polymerizable nitriles as, for example, acrylonitrile and methacrylonitrile,
(6) alkyl acrylates or methacrylates as, for example, methyl acrylate, methyl methacrylate, ethyl acrylate, n-butyl acrylate, n-butyl methacrylate and 2-ethylhexyl acrylate,
(7) polymerizable aromatic compounds as, for example, styrene, α-methyl styrene, vinyl toluene and t-butyl styrene,
(8) α-olefines as, for example, ethylene and propylene,
(9) vinyl compounds as, for example, vinyl acetated and vinyl propionate,
(10) diene compounds as, for example, butadiene, isoprene and the like.

These monomers are used alone or in combination. The polymerization is carried out in a conventional way. At that time, it is preferred to use a polymerization initiator as, for example, an organic peroxide (e.g. benzoyl peroxide, t-butyl peroxide, cumen hydroperoxide and the like), an organic azo compound (e.g. azobiscyanovaleric acid azobisisobutyronitrile, azobis (2,4-dimethyl) valeronitrile, azobis (2-amidinopropane) hydrochloride and the like), an inorganic water soluble radical initiator (e.g. potassium persulfate, ammonium persulfate, sodium persulfate, hydrogen peroxide and the like), a Redox type initiator or the like. A chain transfer agent as, for example, a mercaptan (e.g. ethyl mercaptan, butyl mercaptan, dodecyl mercaptan and the like), a halogenated carbon (e.g. carbon tetrabromide, carbon tetrachloride and the like) may also be used as desired.

Thus obtained acrylic resin of the present invention is characterized by having end carboxyl bearing long pendant groups of the formula:

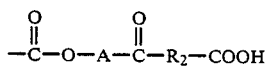

in which A and $R_2$ are as defined above, which are necessarily born from the preparation of the resin. Such resin can exhibit, as compared with heretofore proposed carboxyl containing acryl resins, a far improved curing acceleration activity in the crosslinking reaction with an aminoplast resin. The exact reasons have not been cleared out yet, but the following might be one reason thereof. That is, in the present acryl resin, long pendant groups are protruded out of the resin surface and carboxyl groups are positioned at the end portions thereof. Therefore, such carboxyl groups are accessible to the crosslinking reaction sites, accelerating the crosslinking reaction, after all. Furthermore, in the present acrylic resin, there include both hydrophilic portion represented by the end carboxyl group and hydrophobic portion represented by the alkylene chains of $R_2$ and A and the ratio of these portions may be freely controlled as desired. For this, an excellent surface activation power is given to the resin itself. In fact, the present acrylic resin can be used, preferably in the form of salt, as an emulsifier in an emulsion polymerization of α,β-ethylenically unsaturated compounds. Thus, the present acrylic resin composition is quite useful in a paint industry or the like.

The present invention shall be now more fully explained in the following Examples. Unless otherwise being staed, all parts and percentages are by weight.

REFERENCE EXAMPLE 1

Preparation of end carboxyl bearing acryl monomer (1) Into a 1 liter glass flask fitted with a stirrer, a Dimroth condenser, a thermometer and an air inlet tube, were placed 150 parts of succinic anhydride, 385 parts of Placcel FM-1 (1:1 mol adduct of ε-caprolactone and 2-hydroxyethyl methacrylate, trademark of Daicel Chem. Co.) and 500 ppm of hydroquinone monomethyl ether. While introducing air, the mixture was reacted under stirring at 150° C. (inner temperature) for 40 minutes. After completion of the reaction, the mixture was allowed to cool to a room temperature and the formed crystals of unreacted acid anhydride were filtered off to obtain the desired end carboxyl bearing monomer product (1), whose acid value was 172 and viscosity (25° C.) was 250 cp. The reaction percentage calculated from the measured acid value was 96%.

REFERENCE EXAMPLE 2

Preparation of end carboxyl bearing acryl monomer (2) Into a similar reaction vessel as used in Reference Example 1, were placed 60 parts of succinic anhydride, 440 parts of Placcel FM-5 (5:1 mol addition product of ε-caprolactone and 2-hydroxyethyl methacrylate, trademark of Daicel Chem. Co.) and 500 ppm of hydroquinone monomethyl ether. While introducing air, the mixture was stirred at 150° C. (inner temperature) for 60 minutes to proceed the reaction. Thereafter, the reaction mixture was allowed to cool to precipitate crystals of unreacted acid anhydride, and filtered to obtain the desired end carboxyl bearing reactive monomer product (2), whose acid value was 70 and which was a semi-solid product at 25° C. The reaction percentage was measured as in Reference Example 1 and was found to be 96%.

REFERENCE EXAMPLE 3

Preparation of end carboxyl bearing acryl monomer (3) Into a similar reaction vessel as used in Reference Example 1, were placed 98 parts of maleic anhydride, 480 parts of Placcel FM-3 (3:1 mol addition product of ε-caprolactone and 2-hydroxyethyl methacrylate, trademark of Daicel Chem. Co.) and 500 ppm of hydroquinone monomethyl ether. While introducing air, the mixture was stirred at 150° C. (inner temperature) for 60 minutes to proceed the reaction. Thus obtained product had an acid value of 103 and a viscosity of 350 cp (25° C.). The reaction percentage measured in the same way as stated in Reference Example 1 was 95%.

REFERENCE EXAMPLE 4

Preparation of end carboxyl bearing acryl monomer (4) Into a similar reaction vessel as used in Reference Example 1, were placed 154 parts of tetrahydrophthalic anhydride, 420 parts of Blenmer PE-350 (7-9:1 mol addition product of ethylene oxide and methacrylic acid, trademark of Nippon Yushi) and 500 ppm of hydroquinone monomethyl ehter. While introducing air, the mixture was stirred at 150° C. (inner temperature) for 60 minutes. Thus obtained product had an acid value of 103 and the reaction percentage was 96%.

REFERENCE EXAMPLE 5

Preparation of end carboxyl bearing acryl monomer (5) Into a similar reaction vessel as used in Reference Example 1, were placed 148 parts of phthalic anhydride, 400 parts of Blenmer PP-1000 (5.5:1 mol addition product of propylene oxide and methacrylic acid, trademark of Nippon Yushi), and 500 ppm of hydroquinone monomethyl ether. While introducing air, the mixture was reacted, under stirring, at 150° C. (inner temperature) for 60 minutes. Thus obtained product had an acid value of 108 and a viscosity (25° C.) of 300 cp. The reaction percentage was 95%.

EXAMPLE 1

Into a 1 liter glass flask fitted with a stirrer, a Dimroth condenser, a thermometer, dropping funnels and a nitrogen gas inlet tube, were placed 160 parts of xylene and 16 parts of n-butyl alcohol. To this, was dropwise added a mixture of 17.2 parts of the end carboxyl bearing reactive monomer (1) obtained in Reference Example 1, 60 parts of 2-hydroxy ethyl methacrylate, 132.1 parts of n-butyl acrylate, 80 parts of styrene, 0.4 part of 2-ethyl hexyl methacrylate and 110.4 parts of methyl methacrylate at 130° C. (inner temperature) in 3 hours, while continuing stirring. At the same time, a solution of 12 parts of t-butyl peroxy-2-ethyl hexanoate in 36 parts of xylene and 4 parts of n-butyl alcohol was dropwise added, and a solution polymerization was effected therewith.

Thus obtained product had a solid content of 64% by weight and number average molecular weight of thus formed resin was 7000. The resinous acid value was 7.4 and hydroxyl value was 64.7.

EXAMPLE 2

Into a similar eaction vessel as used in Example 1, were placed 160 parts of xylene and 16 parts of n-butyl alcohol. To this, while stirring and maintaining the temperature at 130° C. (inner temperature), were dropwise and simultaneously added a mixture of 40 parts of the end carboxyl bearing acryl monomer (2) obtained in Reference Example 2, 60 parts of 2-hydroxyethyl methacrylate, 80 parts of n-butyl acrylate, 80 parts of styrene, 40 parts of 2-ethyl hexyl methacrylate and 100 parts of methyl methacrylate and an initiator solution of 12 parts of t-butyl peroxy-2-ethyl hexanoate in a mixture of 36 parts of xylene and 4 parts of n-butyl alcohol in 3 hours and a solution polymerization was effected therewith. Thus obtained product had a solid content of 64% by weight and number average molecular weight of the formed resin was 7000. The resinous acid value and hydroxyl value were 7.4 and 64.7, respectively.

EXAMPLE 3

The same procedures as stated in Example 2 were repeated excepting substituting a monomer mixture of 27.8 parts of end carboxyl bearing acryl monomer (3) obtained in Reference Example 3, 60 parts of 2-hydroxyethyl methacrylate, 2.9 parts of 2-ethyl hexyl methacrylate, 116.4 parts of n-butyl acrylate, 80 parts of styrene and 113.2 parts of methyl methacrylate for the monomer mixture of Example 2. Thus obtained product had a solid content of 64% by weight and number average molecular weight of the formed resin was 7000. The resinous acid value and hydroxyl value were 7.4 and 64.7, respectively.

EXAMPLE 4

The same procedures as stated in Example 2 were repeated excepting substituting a monomer mixture of 23.2 parts of the end carboxyl bearing acryl monomer (4) obtained in Reference Example 4, 60 parts of 2-hydroxyethyl methacrylate, 2.9 parts of 2-ethyl hexyl methacrylate, 116.4 parts of n-butyl acrylate, 80 parts of styrene and 117.8 parts of methyl methacrylate for the monomer mixture of Example 2.

Thus obtained product had a solid content of 64% by weight and number average molecular weight of the formed resin was 7000. The resinous acid value and hydroxyl value were 7.4 and 64.7, respectively.

EXAMPLE 5

The same procedures as stated in Example 2 were repeated excepting substituting a monomer mixture of 21.2 parts of the end carboxyl bearing acryl monomer (5) obtained in Reference Example 5, 60 parts of 2-hydroxyethyl methacrylate, 2.9 parts of 2-ethyl hexyl methacrylate, 116.4 parts of n-butyl acrylate, 80 parts of styrene and 119.8 parts of methyl methacrylate for the monomer mixture of Example 2.

Thus obtained product had a solid content of 64% by weight and number average molecular weight of the formed resin was 7000. The resinous acid value and hydroxyl value were 7.4 and 64.7, respectively.

COMPARATIVE EXAMPLE 1

The same procedures as stated in Example 2 were repeated excepting substituting a monomer mixture of 4.56 parts of methacrylic acid, 60 parts of 2-hydroxyethyl methacrylate, 136.4 parts of n-butyl acrylate, 80 parts of styrene, 9.8 parts of 2-ethyl hexyl methacrylate and 109.2 parts of methyl methacrylate for the monomer mixture of Examle 2. Thus obtained product had a solid content of 64% by weight and number average molecular weight of the formed resin was 7000. The resinous acid value and hydroxyl value were 7.4 and 64.7, respectively.

EXAMPLE 6

The resinous products obtained in Examples 1 to 5 and Comparative Example 1 each was compounded with U-van 20N-60 (trademark of butylated melamine, manufactured by Mitsuitohatsu Chem. Co.) in a solid weight ratio of 7:3, and the mixture was diluted with xylene to an appropriate viscosity suitable for coating purpose. The solid content of thus formed formulation was about 50% by weight. Next, the composition was applied onto a tin plate and baked in an electric furnace at 120° C. for 20 minutes. The formed coating was then subjected to an acetone extraction by using a Soxhlet's extractor for 3 hours. The coating weight was measured just before and after said treatment and acetone insoluble content (%) was calculated as follows:

acetone insoluble content (%)

$$= \frac{\text{coating weight after acetone extraction}}{\text{coating weight before acetone extraction}} \times 100$$

This indicates a relative curing degree. The results are shown in Table 1.

TABLE 1

| resinous varnish used | acetone insoluble content |
|---|---|
| Example 1 | 88.4 |
| 2 | 96.2 |
| 3 | 92.5 |
| 4 | 90.2 |
| 5 | 94.7 |
| Comp. Ex. 1 | 63.8 |

In order to obviate noisy influences of other factors than the long pendant groups on curing behavior, the resinous acid value, hydroxyl value and number average molecular weight of the respective resins were each maintained at a constant value.

What is claimed is:

1. A resinous composition comprising an acrylic resin having end carboxyl bearing long pendant groups of the formula:

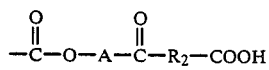

wherein $R_2$ is a substituted or unsubstituted aliphatic hydrocarbon having 2 to 10 carbon atoms, alicyclic hydrocarbon having 6 to 7 carbon atoms or aromatic hydrocarbon having 6 carbon atoms; A is a repeating unit of

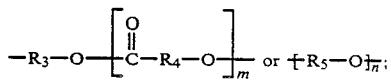

$R_3$ is ethylene or propylene; $R_4$ is a substituted or unsubstituted alkylene having 2 to 7 carbon atoms; $R_5$ is a substituted or unsubstituted alkylene having 2 to 5 carbon atoms; m is an integer of 1 to 10; and n is an integer of 2 to 50.

* * * * *